May 28, 1929.  H. B. KRAUT  1,714,603
MACHINE FOR RECLAIMING RAILS
Filed April 16, 1925   11 Sheets-Sheet 2
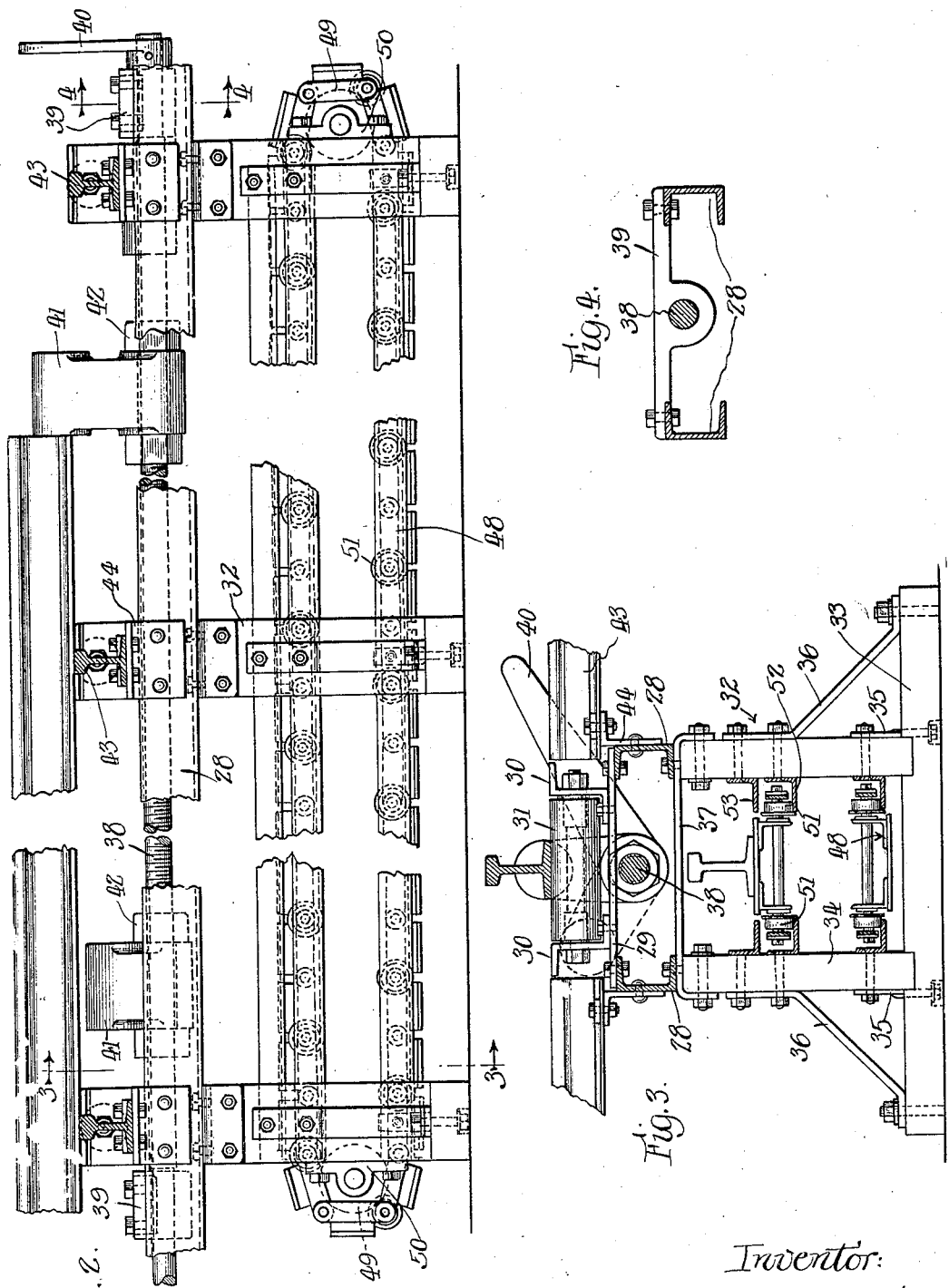
Inventor:
Hans B. Kraut,
By Christahl Parker Carlson
Attys.

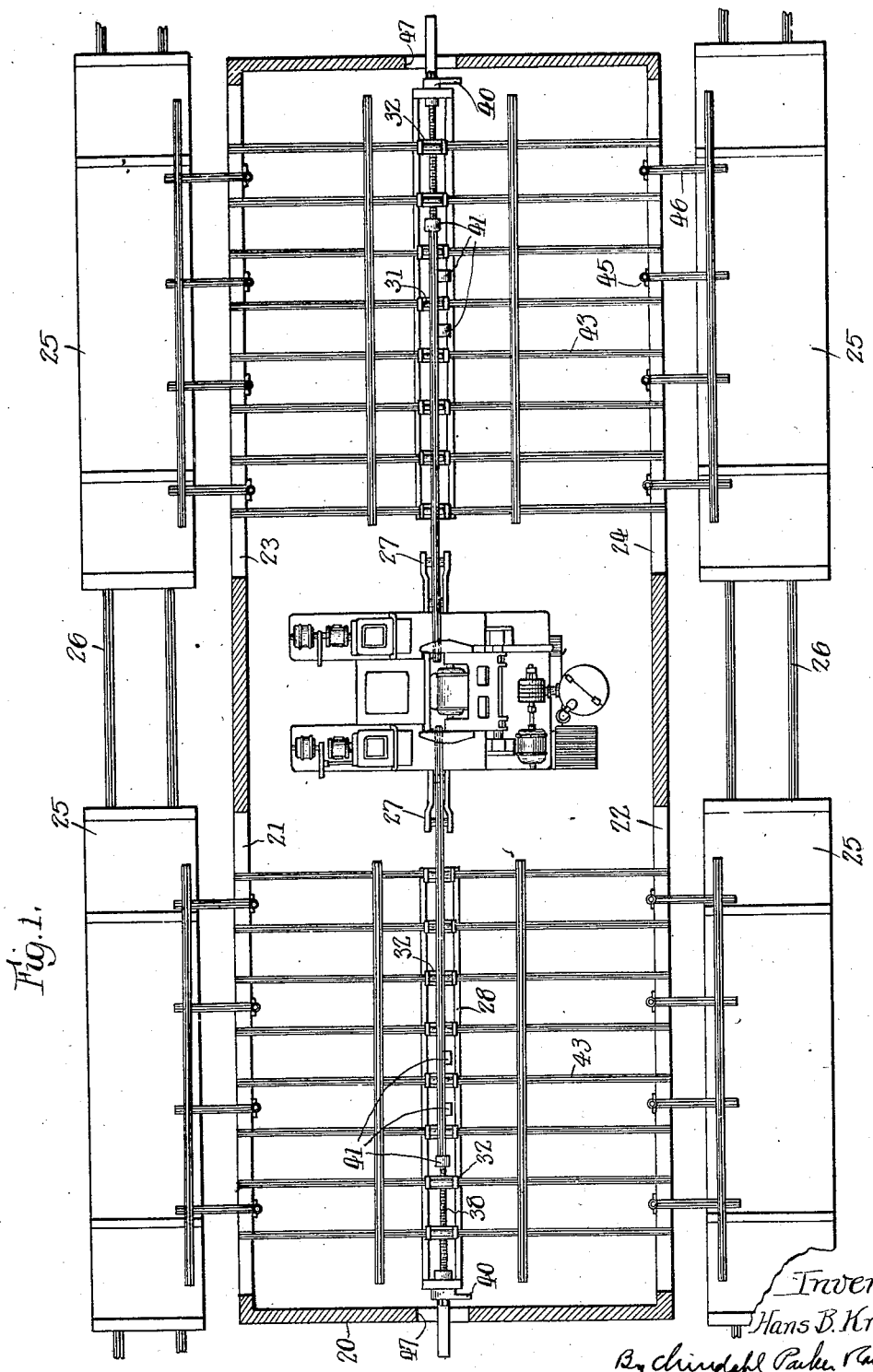

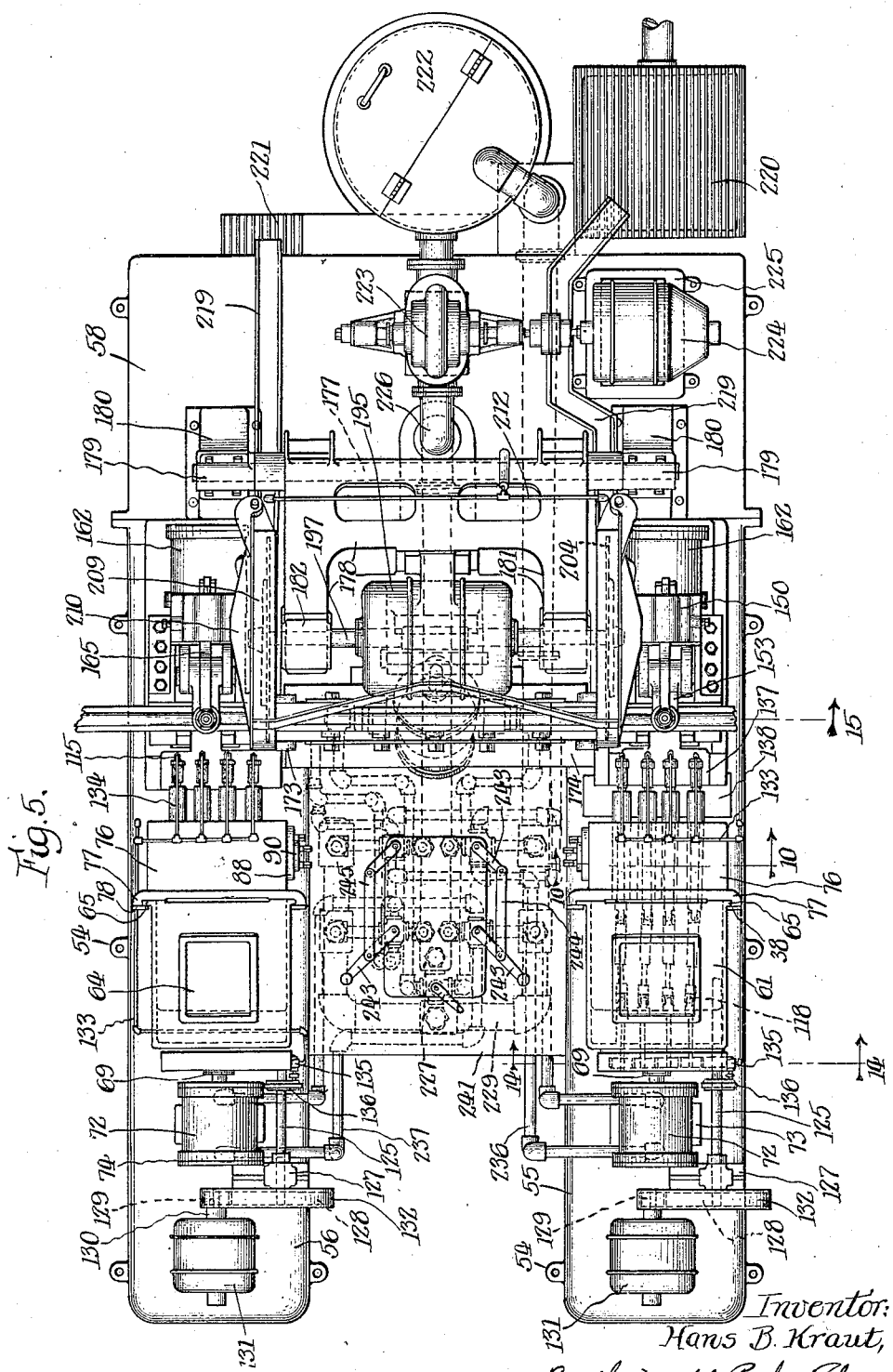

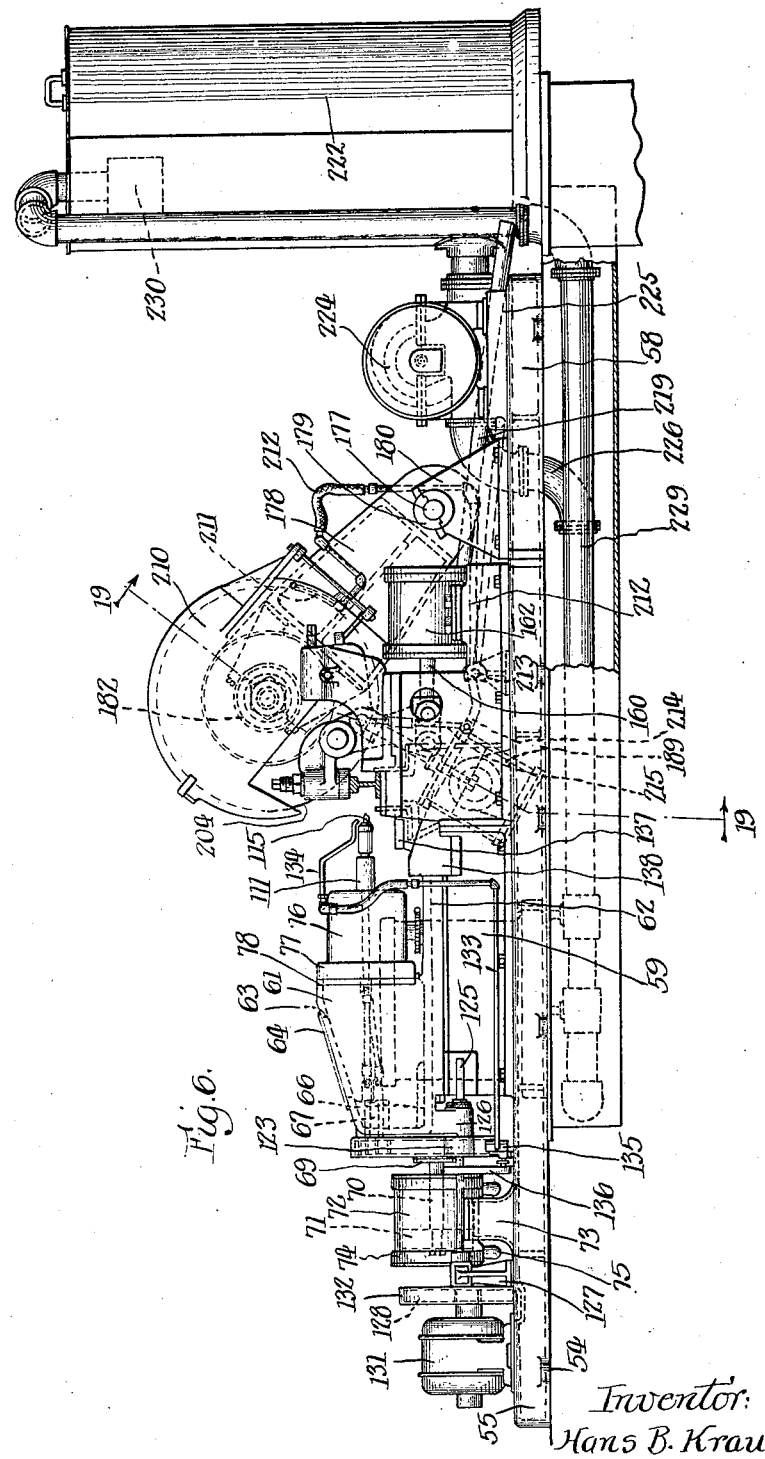

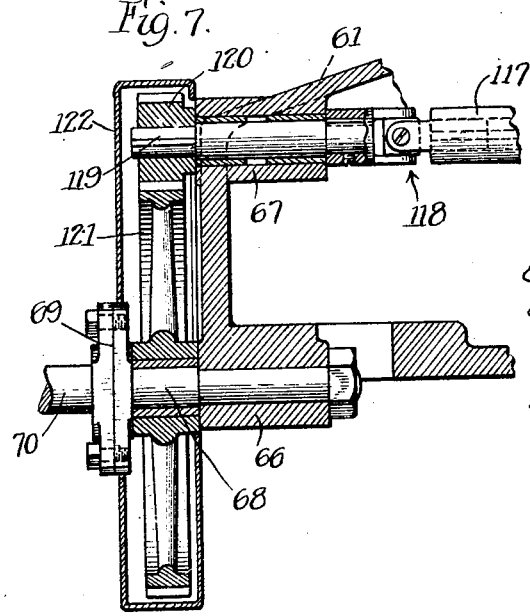
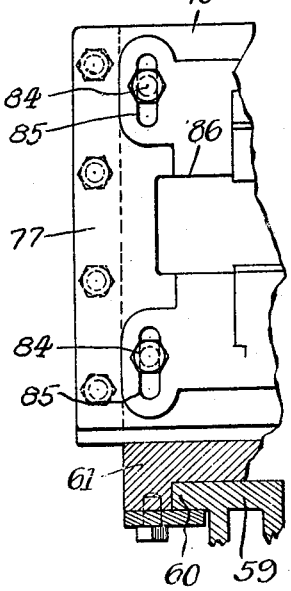
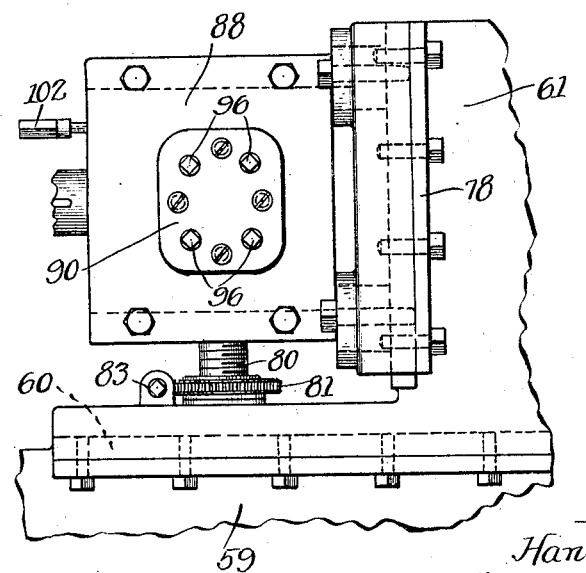

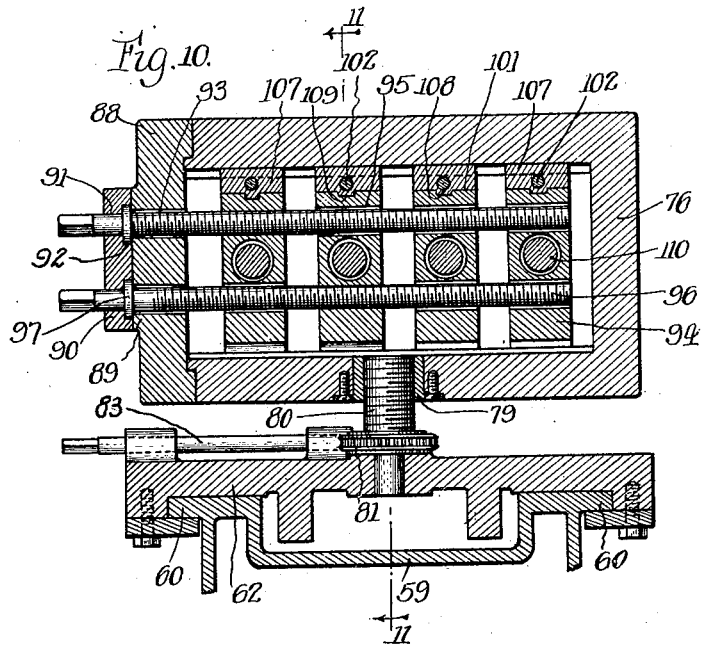

May 28, 1929.   H. B. KRAUT   1,714,603
MACHINE FOR RECLAIMING RAILS
Filed April 16, 1925   11 Sheets-Sheet 7
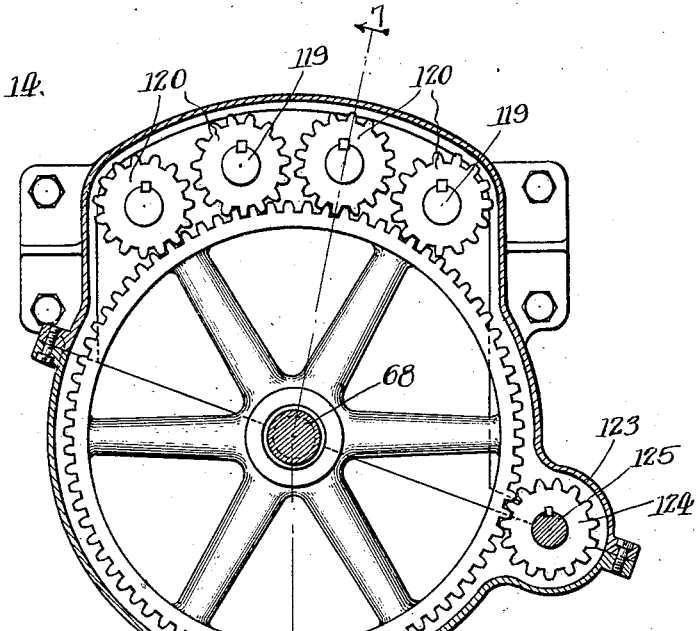
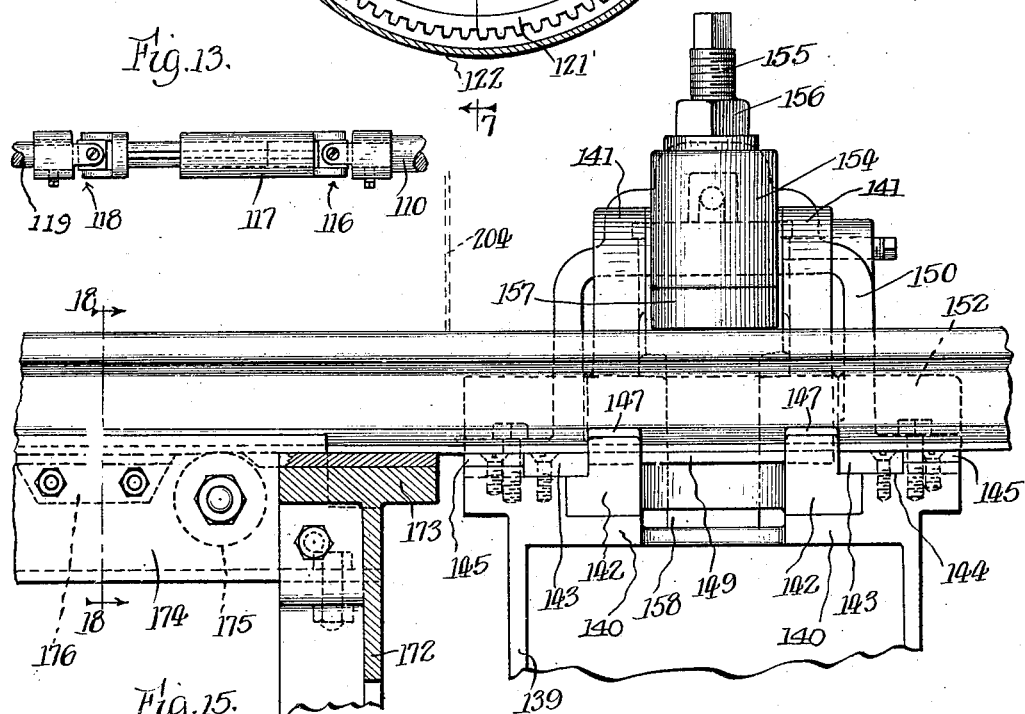
Inventor:
Hans B. Kraut,

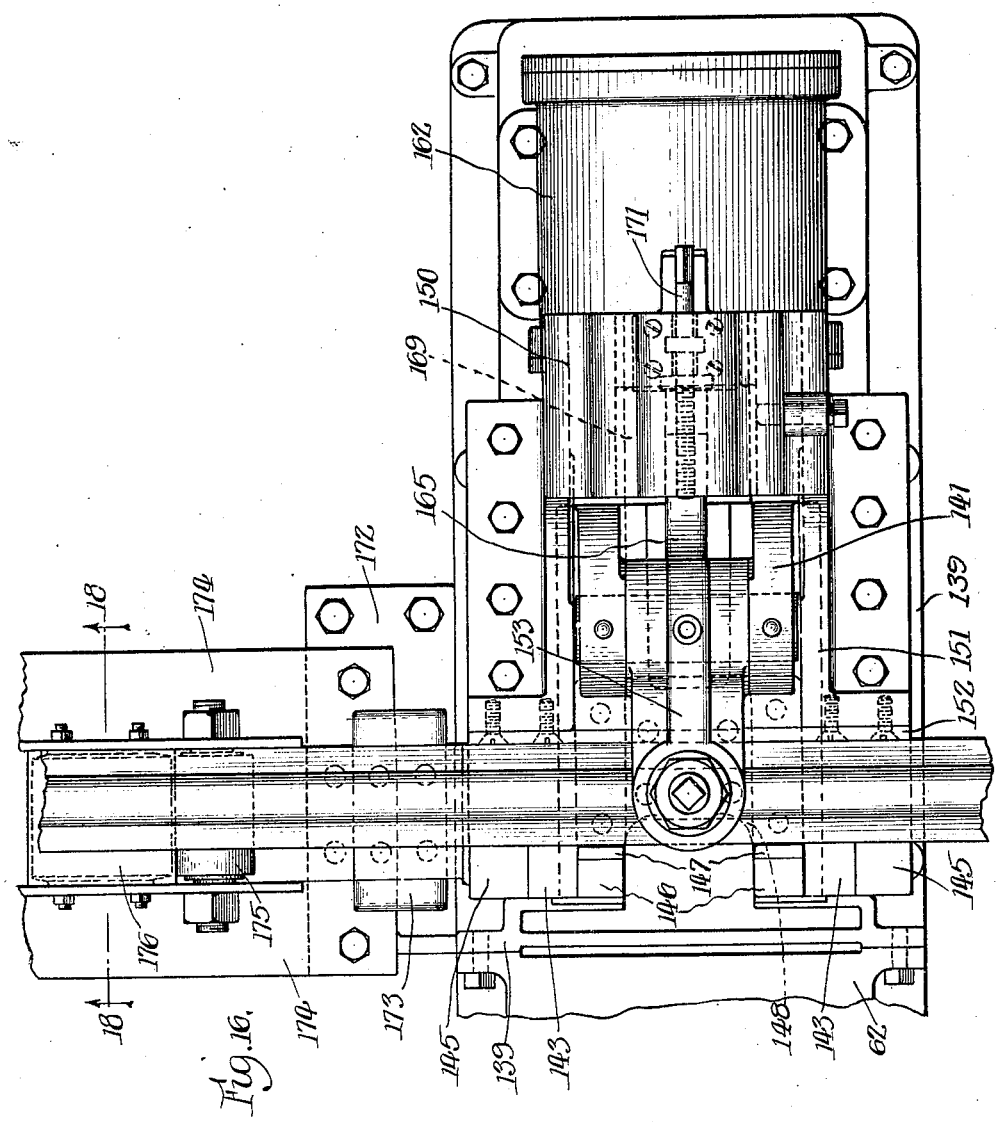

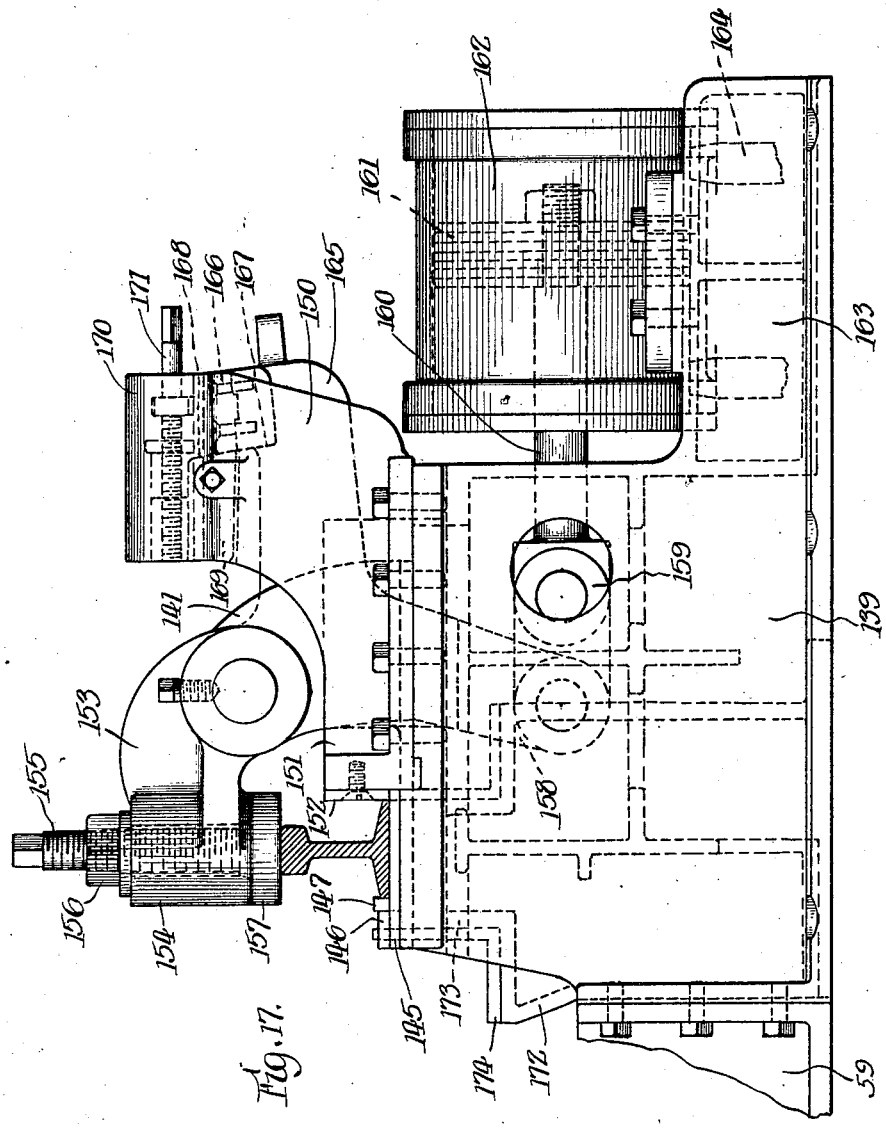

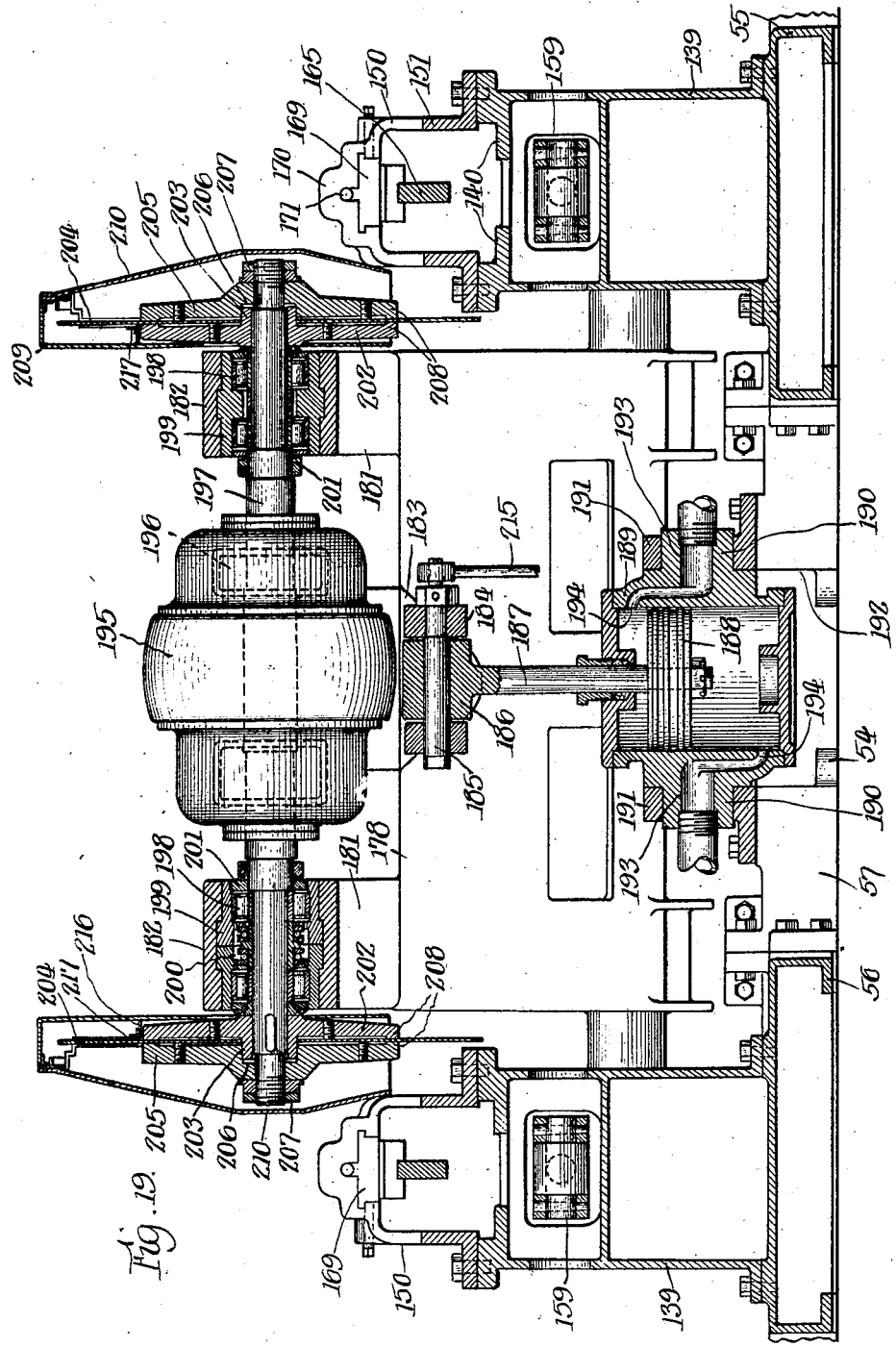

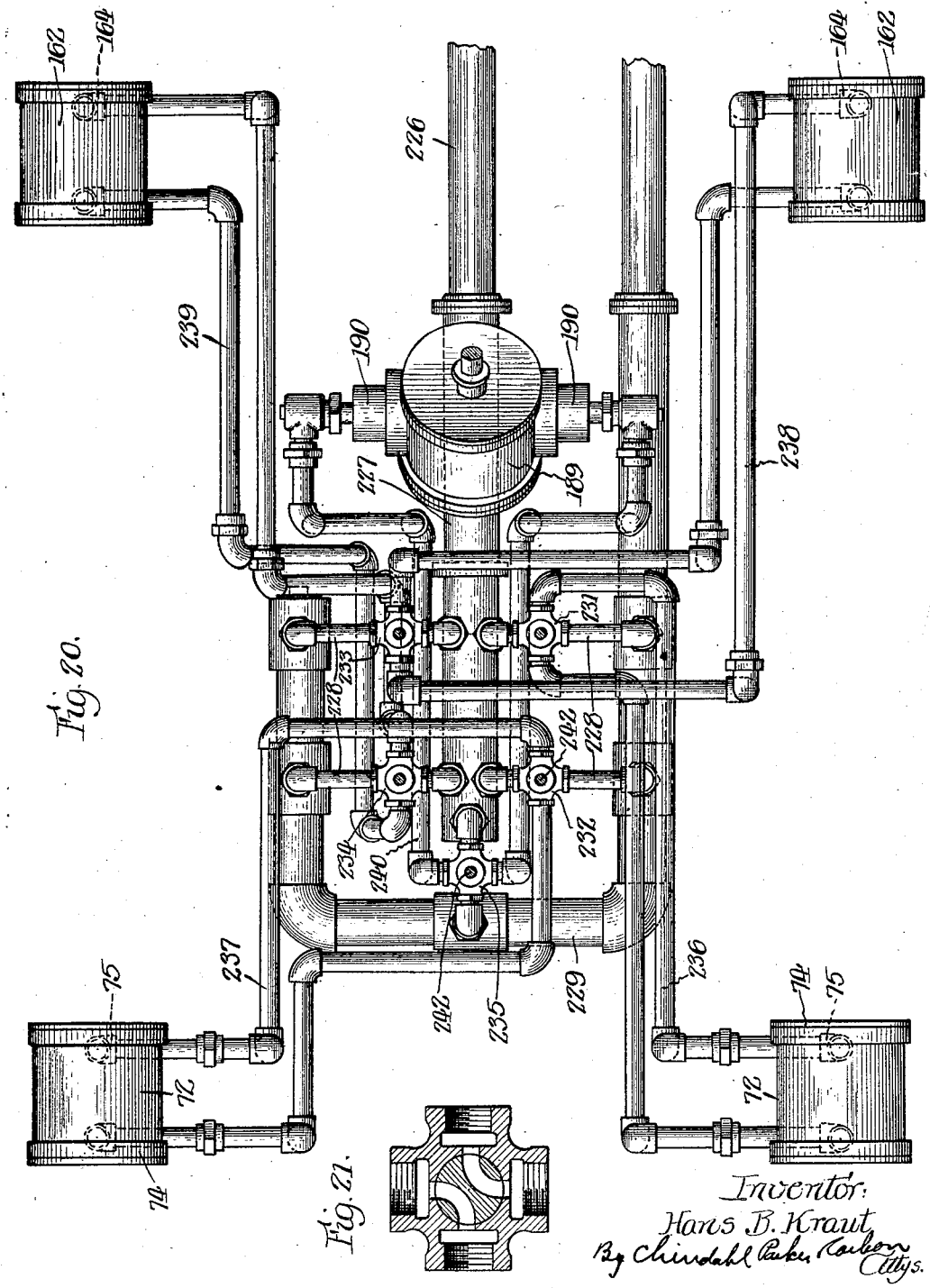

Patented May 28, 1929.

1,714,603

UNITED STATES PATENT OFFICE.

HANS B. KRAUT, OF FOND DU LAC, WISCONSIN, ASSIGNOR TO GIDDINGS & LEWIS MACHINE TOOL COMPANY, OF FOND DU LAC, WISCONSIN, A CORPORATION OF WISCONSIN.

MACHINE FOR RECLAIMING RAILS.

Application filed April 16, 1925. Serial No. 23,482.

The present invention relates to an improved machine for reclaiming damaged railroad rails, that is, rails having worn, battered or broken ends which render them unfit for further use.

On busy and important railroads, the rails must be frequently replaced due primarily to the fact that the ends of the rails become crystallized and battered by the continual pounding they receive from the car wheels passing thereover. Unless the rails that are taken up can be reclaimed or reconditioned for use, a large loss in cost of materials will result. Heretofore various methods have been employed for this purpose. Thus, it has been the practice to heat and reroll the damaged rails. This method, however, is costly and requires considerable time, frequent handling, and long transportation, thereby causing congestion due to the seasonal character of the work. It has also been customary to saw off about one foot of the damaged ends having holes for the rail connecting plates, and to redrill the newly cut ends. In this last method, however, each end is sawed separately and then drilled separately by separate machines of standard construction, thereby necessitating frequent handling of the rails and turning them end for end to present the opposite ends. The method involves a considerable loss in time and labor, is cumbersome and awkward, and is dangerous to the workmen.

One of the objects of the invention is to provide equipment for reclaiming rails which comprises a rail handling structure adapted to receive the rails from cars positioned along side the same and serving to facilitate moving the rails into alinement, a machine adapted to receive the rails from said structure and to operate upon the adjacent ends of two rails passing therethrough to simultaneously saw and drill each end, and a second rail handling structure adapted to receive the rails from the machine and to facilitate sorting them and reloading them upon adjacent cars.

Another object is to provide a unitary self contained machine of novel construction adapted to receive a series of rails and to saw and drill each end.

A further object is to provide a machine of the above character having a number of operating units, such as a drilling mechanism, a work supporting and clamping mechanism, a sawing mechanism, and an operating mechanism therefor, which can be operated by one attendant from a position in which he can observe the working movements of the entire equipment.

Other objects are to provide novel means for gaging the rails to position them in the machine, means for cooling the saw blades, and means for carrying and conducting away the waste products of the operation.

Still other objects reside in the specific construction of each of the various units constituting the machine.

A further object is to provide a machine of the above character which is simple and sturdy in construction, which does away with turning the rails end for end and other unnecessary rehandling thereof, and which is expeditious and efficient in operation.

Ancillary objects and advantages will become apparent as the description proceeds.

In the accompanying drawings, Figure 1 is a plan view of a rail reclaiming plant embodying the features of my invention.

Fig. 2 is a fragmentary view in elevation of one of the roll tables for the rails.

Fig. 3 is a sectional view taken along line 3—3 of Fig. 2.

Fig. 4 is a sectional view taken along line 4—4 of Fig. 2.

Fig. 5 is a plan view of the rail reclaiming machine.

Fig. 6 is a front side elevation of the machine.

Fig. 7 is a fragmentary sectional view taken along line 7—7 of Fig. 14.

Fig. 8 is a fragmentary view showing the means for clamping the drills in vertically adjusted position.

Fig. 9 is an inner end view of one of the spindle bearing housings.

Fig. 10 is a sectional view taken along line 10—10 of Fig. 5.

Fig. 11 is a fragmentary sectional view taken along line 11—11 of Fig. 10.

Fig. 12 is an enlarged view of the means for clamping one of the spindle bearing blocks in laterally adjusted position.

Fig. 13 is a fragmentary view of one of the flexible shafts for driving the drill spindles.

Fig. 14 is a sectional view taken along line 14—14 of Fig. 5.

Fig. 15 is a fragmentary view taken substantially along line 15 of Fig. 5 and showing one end of one of the clamping mechanisms.

Fig. 16 is a plan view of one of the clamping mechanisms, and a fragment of the intermediate roll table.

Fig. 17 is a front view in elevation of said clamping mechanism.

Fig. 18 is a sectional view of the intermediate roll table taken along line 18—18 of Fig. 15.

Fig. 19 is a transverse sectional view of the machine taken substantially along line 19—19 of Fig. 6.

Fig. 20 is a diagrammatic representation of the hydraulic operating mechanism for the different units of the machine.

Fig. 21 is a sectional view of one of the four-way valves forming part of said operating mechanism.

While the invention is susceptible of various modifications and alternative constructions, I have shown in the drawings and will herein describe in detail the preferred embodiment, but it is to be understood that I do not thereby intend to limit the invention to the specific form disclosed but aim to cover all other forms falling within the spirit and scope of the invention as expressed in the appended claims.

Referring to Fig. 1, the invention in its exemplary embodiment contemplates the provision of a rail reclaiming machine for reconditioning the ends of rails, and suitable rail handling mechanism for feeding the rails endwise and in series to the machine and discharging them therefrom without turning them end for end or on a longitudinal axis. The rail reclaiming machine will be subsequently described in detail, and briefly stated comprises two multiple spindle drilling mechanisms mounted in spaced relation and adapted to operate successively on the opposite ends respectively of each rail, two work supporting and clamping mechanisms one of which is associated with each drilling mechanism, a twin blade high speed friction saw located between the two drilling mechanisms and adapted to saw off the adjacent ends of the two rails in the machine at any one time, hydraulic operating mechanism for the above units, and a control stand positioned between the drilling mechanisms and at the head of the friction saw to enable the operator to observe all working movements of the entire equipment.

*The plant.*

The rail reclaiming equipment preferably constitutes part of each of a series of fixed and established plants situated at advantageous points along the railroad. In the present instance, each plant is located in a long rectangular building 20 which is open in opposite ends of its side walls at 21, 22, 23, and 24. To permit railroad cars 25 to be positioned alongside these open spaces for the purpose of bringing and taking away the rails, tracks 26 are laid at opposite sides of the building. While this construction is the preferred one, it is to be understood that when desired only one track need be provided, the rails in such event being unloaded and reloaded at only one side of the building.

The rail reclaiming machine is securely fixed to the center of the floor, and is so positioned that the guideway extending therethrough is disposed lengthwise of the building. Opposite ends of this guideway are contiguous to two pairs of guides 27 flared apart at their outer ends to direct the ends of the rails into and out of the machine, and are alined with runways or roll tables at opposite sides of the machine.

Each roll table (see Figs. 1 to 3) comprises a pair of horizontal spaced ship channels 28, the legs of which are horizontally disposed and extend toward each other, and the upper legs of which serve to support a plurality of uniformly spaced plates 29. Mounted on each of these plates are a pair of Z-shaped brackets 30 in which a heavy roller 31 is rotatably journaled.

The channels 28 are supported by a plurality of standards 32, each of which comprises a base 33 mounted on the floor of the building. A pair of spaced vertical columns 34 extend up from the base, and are secured thereto by a pair of bolts 35 and a pair of braces 36. The upper ends of the columns 34 are connected by a channel plate 37 on which the channels 28 rest.

The roll tables are each provided with adjustable gage means for properly positioning the rails in the machine to obtain reclaimed rails of uniform length. Each gage means comprises an adjusting screw 38 which extends longitudinally of the roll table between the plates 29 and 37, and the opposite ends of which are suitably journaled in bearings 39 mounted on the channels 28. The screw is provided with a hand lever 40 for rotating the same. A plurality of gage blocks 41, three in the present instance, are adjustably mounted on the screw 38 in different positions along the roll table, and in different angular positions, and are adapted to be clamped rigidly to said screw by lock nuts 42. This permits of swinging the blocks 41 selectively into a plane above that of the rollers 31 to serve as a stop for the rail, and of adjusting the selected block longitudinally on the screw 38, to accurately position the same for rails of different lengths.

Extending from each side of the roll tables to the side walls of the building to constitute work handling structures are a plurality of parallel skids 43. The outer ends of these skids rest on the sills of the openings in the side walls of the building, and the inner ends thereof are supported by a plurality of angle brackets 44 secured to the backs of the channels 28. Mounted in brackets 45 on the side walls of the building and between successive pairs of skids 43 are a plurality of pivotal arms or guides 46 which are adapted to be swung outwardly to rest on the adjacent railroad cars, and which thus constitute pivotal extensions of the skids 43 facilitating the unloading and loading of rails.

The roll tables are each provided with a scrap conveyor for removing from the machine the cull ends of rails sawed off in the machine operation and other refuse, and discharging the same through openings 47 in the front and rear end walls of the building. In the present instance each conveyor comprises a continuous link belt 48 which runs over idler pulleys 49 suitably journaled in bearings 50 on the end standards 32 of the roll table, and which is adapted to be driven by any sutiable means (not shown). The links of the belt 48 are pivotally connected, and alternate pivot members are provided with wheels 51 which are adapted to run along two sets of tracks extending through the standards 32 below the rollers 31. In the present instance these tracks consist of four angle irons 52 which extend between the idler pulleys 49 and which are secured to the inner sides of the columns 34. Lateral displacement of the belt 48 on the tracks is prevented by a pair of angle irons 53 closely overlying the upper pair of irons 52 and also secured to the columns 34.

The method.

The method is well exemplified by the operation of the rail reclaiming equipment, a detailed account of which will be given subsequently hereto.

Briefly stated, the rails can be unloaded from the cars 25 at either end of the building, and after being reclaimed can be reloaded at the other end. Assuming the cars loaded with the damaged rails to be positioned next to the openings 21 and 22 at the front end of the building, the guides 46 are swung outwardly. The rails are then unloaded onto these guides, and are moved along the skids 43 into position on the front roll table. From there, the rails are intermittently fed endwise and in series to the machine, and are reclaimed in a continuous cycle of operations.

Thus, the two rails in the machine are accurately positioned on the roll tables by means of the gage blocks 41. The leading end of the second rail and the rear end of the first rail are clamped in the first and second drilling mechanisms respectively, and are sawed and drilled simultaneously. The first rail is then discharged from the machine, and the second rail is advanced with its rear end positioned in the second drilling mechanism. A new rail is advanced to the first drilling mechanism, and the above operation is repeated. The operation therefore results each time in the complete reclamation of one rail.

The reclaimed rails after being discharged onto the rear roll table are moved along the skids 43 to either of the cars 25 positioned next to the openings 23 and 24. In reloading, consideration is to be taken of the shape of the rails. In use, the rails are distorted outwardly with reference to the track. Upon relaying these rails it is desirable that they be reversed end for end so that the tops thereof will be inclined inwardly against the thrust of the car wheels. To facilitate re-laying the rails in this way, those on each car should be so arranged that their distorted tops are inclined in one direction. When rails are loaded only onto one car, certain of them must be turned end for end to accomplish this result. By loading the rails onto cars located at opposite sides of the building, those distorted oppositely can be easily sorted and loaded onto separate cars.

It will be evident that by the above method old rails can be expeditiously and economically reclaimed by sawing off the old ends and redrilling the new ends. The rails need not be turned end for end at any stage of the operation, and can be sorted and assembled with ease, thereby resulting in a considerable saving of time, labor and expense, in safety of operation, and in an increased capacity or output. These advantages are particularly important since the work of reclaiming rails is seasonable in character.

The machine.

The rail reclaiming machine comprises a plurality of heavy sole or base plates which are firmly attached to the floor by means of lugs 54, and which are rigidly bolted together to constitute a unitary base. These sole plates, more specifically consist of two long side plates 55 and 56, a central plate 57 at one end and between the side plates, and an end plate 58 abutting against the other plates.

The drilling mechanisms.

Since these mechanisms are substantially alike in construction, only one (see Figs. 5 to 9) will be described in detail. Mounted centrally on the front sole plate 55 is a base 59 of rigid box construction for the first drilling mechanism, which is closed at the bottom so as to constitute a reservoir adapted to contain a coolant for the drills, and which is formed at the top with a pair of longitudinal horizontal ways 60. A drill carriage 61 also of box construction and provided with a longitudinal extension or shelf 62 at its right end is slidably mounted on the ways 60, and is formed in its top with a large opening 63 normally closed by a removable cover 64 and giving access to the interior. The carriage is formed on its right end with a pair of vertical ways 65 next to the shelf 62, and at its left end with a central hub or bracket 66 and a plurality of bearings 67 spaced above and equally in an arc about said hub. A stud or pin 68 is rigidly secured to the hub 66, and is connected by means of a flexible coupling 69 to one end of a piston rod 70 attached to a piston 71. The latter is reciprocable in a horizontal cylinder 72 which is mounted on a pedestal 73 bolted to the sole plate at the left of the base 59. The cylinder 72 is provided with removable heads 74, and with suitable pipe fittings 75 connecting opposite ends of its interior into a pressure fluid line.

A spindle bearing housing 76 having guides 77 engaging the sides of the carriage 61 is mounted over the shelf 62 for vertical adjustment on the ways 65, and is held thereon by gib plates 78 secured to said guides. A flanged nut 79 is rigidly secured in the lower wall of the housing 76, and is threaded onto a vertical adjusting screw 80 journaled in the shelf 62. The screw 80 is operatively connected through a worm gear 81 and worm 82 to a shaft 83 which extends to the remote or inner side of the drilling mechanism, and which is squared at its inner end to permit the use of a crank handle. Bolts 84 extending through vertical slots 85 in the guides 77 are threaded into the carriage 61, and serve as a means for locking the housing 76 in vertically adjusted position.

The interior of the housing 76 (see Figs. 10 to 12) constitutes a long narrow chamber with machined surfaces which is open at its rear or inner end, and which communicates with long narrow horizontal openings 86 and 87 in the right and left side walls respectively. The end of the housing is closed by a removable end plate 88 which is provided with a small machined face 89 on its outer surface. A small cap 90 is bolted against the face 89, and is provided with four rectangularly spaced bores 91 which are formed with enlargements 92 in the inner surface of the cap and which are alined with similar bores 93 extending through the end plate 88.

A plurality of bearing blocks 94, four in the present instance, are mounted for sliding adjustment in the housing 76. Each block is provided with four holes 95, one of which is threaded to engage an adjusting screw 96 while the others fit loosely over the corresponding screws for the remaining blocks. The adjusting screws 96 extend through the bores 93 and 91 in the end plate 88 and cap 90, are provided with collars 97 fitting within the enlargements 92 to prevent endwise movement, and are formed with squared outer ends adapted to receive a crank handle. Each block 94 is formed with side extensions 98 and 99 which project into the openings 86 and 87 respectively, and with a pair of spaced lugs 100 on its upper edge separated by an inclined wedge surface 101. A clamp screw 102 extends loosely through alined bores 103 and 104 in the lugs 100, and is rotatably supported and held against endwise movement by a collar 105 clamped in an enlargement 106 of the bore 103 by the associated lug and the right side wall of the housing 76. The screw 102 extends out through the opening 86, and is provided with a squared end. Adjustably mounted on the screw 102 between the lugs 100, and engaging the wedge surface 101 is a wedge block 107 adapted to be moved into clamping engagement with the upper wall of the housing. The block 107 is held against lateral displacement by a key 108 slidably engaging a keyway 109 in the wedge surface 101. The bearing blocks 94 can thus be adjusted laterally relative to each other and can be locked in place by means of the sliding wedge blocks.

Rotatably mounted in each bearing block is a drill spindle 110 extending out of the housing 76 through the openings 86 and 87. The outer or right end of the spindle is provided with a nose 111 which is spaced from the bearing block 94 by a thrust ball bearing 112, and which is formed with a conical socket 113 for the shank of a drill head 114 having a suitable drill 115. The inner end of the spindle 110 is connected through a universal joint 116, an extensible shaft 117, and a universal joint 118 to one of four shafts 119 journaled in the bearings 67 on the carriage 61 (see Figs. 13 and 14). Each of the shafts 119 is provided with a pinion 120 meshing with a large gear 121 on the stud 68. A guard 122 secured to the left end of the carriage 61 encloses the gear and pinions, and is formed at one side with an extension 123 in which a drive pinion 124 meshing with said gear is disposed. The drive pinion 124 is keyed to a drive shaft 125, one end of which extends slidably through the extension 123 into a bearing bracket 126 on the front side of the carriage 61. The other end of the drive shaft 125 is supported by an upstanding bearing bracket 127 on the sole plate 55, and is connected through a large gear 128 to a pinion 129. The latter is mounted on the shaft 130 of an electric motor 131, and with the gear 128 is enclosed by a guard 132, both the motor and the guard being suitably mounted on the left end of the sole plate 55.

Coolant from the reservoir in the base 59 is supplied to the individual drills 115 through a pipe 133 and a series of nozzles 134 communicating therewith, by a pump 135 driven from the shaft 125 through a belt transmission 136. A chip box 137 having a perforated bottom (not shown) is removably mounted below the drills 115 to catch the refuse from the drilling operation, and a sheet metal cover 138 is mounted on the front end of the base 61 to prevent chips from falling into the coolant reservoir.

It will be evident that the drills 115 can be vertically adjusted as a unit by means of the adjusting screw 80, and can be relatively adjusted laterally to properly position them with respect to rails of different sizes. Any desired number of drills 115 can be employed.

The second drilling mechanism is identical in construction to the first with the exception that the means for adjusting the housing 76 and the bearing blocks 94 are operable from the front side for the convenience of the machine operative, and that the coolant pipe 133 extends along the rear side of the base 61.

*The clamping mechanisms.*

Associated with each set of drills 115 is a hydraulic clamping mechanism (see Figs. 15 to 17) which comprises a hollow base 139 bolted to the right end of the sole plate 55 and formed on the top with a pair of horizontal ways 140. A bearing slide having two upstanding arms 141 and a pair of parallel horizontal arms 142 is slidably mounted on the ways 140 and is held against vertical displacement by gib plates 143 fitting in notches 144 in the sides of the base. Two hardened bearing strips 145 are secured to the sides of the base next to the outer side edges of the gib plates 143. The ends of the arms 142 are provided with upwardly extending lugs 146 which fit against similar lugs 147 on the arms 148 of a hardened bearing plate 149 secured to the arms 142. Rigidly mounted on the base 139 is a hollow casting 150 having spaced arms 151 extending along opposite sides of the upstanding arms 141 of the bearing slide. The forward ends of the arms 151 are connected by a vertical bearing plate 152 which with the bearing plates 145 and 149 constitute a guideway and support for the rails to be reclaimed.

Pivotally mounted between the upstanding arms 141 of the bearing slide is a bell-crank lever, one arm 153 of which extends horizontally over the rail guideway and is provided with a sleeve 154. Removably secured to the sleeve 154 by means of a threaded stem 155 and a nut 156 is a hardened clamping head 157. The other arm 158 of the bell-crank lever extends downwardly through the casting 150 and the bearing slide into the base 139, and is connected through a flexible connection 159 to the outer end of a piston rod 160 extending horizontally out of the base. The piston rod is provided with a piston 161 reciprocable in a horizontal cylinder 162 which is mounted on a shelf extension 163 of the base and which is provided with suitable pipe fittings 164 for connecting its interior into a suitable pressure fluid line.

The bell-crank lever is provided with a horizontal arm 165 extending in a direction opposite to that of the arm 153 and having a hardened bearing plate 166 removably secured to the upper side of its end. This bearing plate is formed with a wedge surface 167 adapted to coact with a wedge surface 168 on a block 169 which is adjustably mounted in an enlargement 170 on the casting 150, and which can be adjusted by means of a screw 171 rotatably but non-slidably mounted in said enlargement.

It will be evident that as the piston 161 is moved to the right, the clamping head 157 will be brought down into clamping engagement with the top of the rail on the guideway. As this clamping movement occurs, the wedge surfaces 167 and 168 will cause the bearing slide to move slightly to the right, thereby also clamping the bottom of the rail between the lugs 148 and the bearing plate 152. The clamping head 157, the plate 166, and the wedge block 169 can be adjusted or changed to clamp rails of different sizes.

Joining the two clamping mechanisms for the purpose of guiding the rails passing from one to the other is an intermediate roll table (see Figs. 5 and 15 to 18) which comprises two heavily ribbed end blocks 172. These blocks are secured to the sole plates 55 and 56 closely to but slightly spaced from the adjacent sides of the base sections 139. Each block 172 is formed with a lateral extension 173 forming a guideway which constitutes a continuation of the guideway on the associated clamping mechanism. Extending between the guideways on the end blocks 172 are a pair of angle irons 174, the opposite ends of which rest on said blocks and fit against the sides of the extensions 173. The horizontal legs of these angle irons extend in opposite directions, and the vertical legs thereof constitute the sides of a guideway for the intermediate roll table. A plurality of equally spaced rollers 175 are journaled in said vertical legs, and constitute the bottom of the table guideway. The spaces between the rollers 175 are substantially closed by a plurality of inverted channel sections 176 which are secured to the adjacent sides of the angle irons 174 and which are positioned slightly below the upper ele-

The sawing mechanism.

Pivotally mounted on a shaft 177 for movement between the two clamping mechanisms (see Figs. 5, 6 and 19) is a heavily ribbed tilting carriage 178 of box construction. The shaft 177 is journaled at its opposite ends in split bearings 179 which are supported by pedestals 180 bolted to opposite sides of the end sole plate 58. The free end of the carriage 178 is formed with spaced extension arms 181 having split bearings 182 on their outer ends, and is also formed with a depending bearing bracket 183. A forked connection 184 is provided with a stem pivotally secured in the bracket 183, and with a pin 185 extending through its arms. Pivotally mounted on the pin 185 between the arms of said connection is a block 186 which is formed on one end of a piston rod 187 having a piston 188 attached to its other end. The forked connection 184 with its associated parts thus constitute a universal joint between the pivotal carriage 178 and the piston rod 187. The piston 188 is reciprocable in a cylinder 189 which is provided with trunnions 190 pivotally mounted in suitable bearings 191 on the inner sole plate 57. To permit a free pivotal movement of the cylinder 189, the sole plate 57 is formed with an open space 192 in its inner edge. The trunnions 190 are formed with central passages 193 which communicate with ports 194 opening into opposite ends of the cylinder 189, and are connected into a suitable pressure fluid line.

Securely mounted on the free outer end of the pivotal carriage 178 between the extension arms 181 is an electric motor 195. The motor is completely enclosed except for a number of wire gauze covers 196 permitting ample ventilation. Opposite ends of the motor shaft 197 extend through the arms 181 and are therein supported by suitable roller bearings 198, such as Hyatt roller bearings. These bearings are mounted in bushings 199 clamped in the split bearings 182 on the carriage. Two thrust ball bearings 200 are also mounted between the roller bearings in the rear extension arm 181, and serve to take up the end thrust in both directions regardless of expansion or contraction of the motor shaft 197. Suitable dust rings 201 on the motor shaft engage opposite sides of the split bearings 182 to prevent the entrance of dust, coolant or other foreign substance.

Keyed onto each end of the motor shaft 197 is a heavy circular disk 202 having a central hub or flange 203 on which a circular saw blade 204 is non-rotatably mounted. A second disk 205 having a depression 206 telescoping with the hub 203 is also mounted on the shaft, and is adapted to be clamped against the outer face of the saw 204 by two clamp nuts 207. The disks of each pair are formed with opposed annular flanges 208 which engage opposite sides of the saw blade at a substantial distance from the center of rotation to secure a firm mounting. Each saw blade 204 is enclosed by a suitable hood 209 which is bolted to one of the extension arms 181, and which is open at the bottom to permit the saw to move into engagement with the rail at a point between the base 139 and the guideway 173. The hood 209 is provided with a hinged cover 210 to permit a convenient substitution of saws.

Coolant under high pressure is adapted to be forcibly injected into the hood and against the lower peripheral edge of the saw blade 204 from a perforated nozzle 211. The nozzles 211 for the two hoods are connected through a common pipe line 212 to a valve 213 of any suitable construction which is controlled by a lever 214 and which is connected to a suitable coolant supply (not shown). The lever 214 is connected through an adjustable rod 215 with the tilting carriage 178 so that when the latter is lowered the valve 213 is automatically opened and when it is raised said valve is automatically closed. Formed on the inner side of the hood is an annular flange 216 concentric with the shaft 159. An angle iron 217 bent into circular form is secured to the outer edge of the flange 216, and serves therewith to prevent the coolant from splashing and from being carried around in large quantities with the saw blade 204 to the work.

The sludge and other refuse from the sawing operation, such as dust, fins, burrs, and coolant, are caught in a trough 219 mounted below each hood, and are thereby conducted to a catch basin 220 at the right end of the machine. The trough 219 at the rear side of the machine first empties into a second trough 221 which in turn empties into the catch basin. The cull ends of the reclaimed rails are carried away by the conveyors 48.

The operating mechanism.

Fluid for operating the different units of the machine is taken from a large supply tank 222 (see Figs. 5 and 6) mounted at the right end of the machine by means of a centrifugal pump 223 mounted on the end sole plate 58. The pump is driven by an electric motor 224 having a base 225 suitably secured to said sole plate. From the pump 223, the pressure fluid is forced through a large main 226 into a header 227 at its left end (see Fig. 20). The header is connected by five short pipe lines 228 to a large return pipe 229 which serves to return the spent fluid through a strainer 230 into the top of the supply tank 222 for re-use.

Connected in the five pipe lines 228 are a plurality of four way valves 231, 232, 233, 234, and 235 respectively. The valves 231 and 232 serve to connect the cylinders 72 of the first and second drilling mechanisms respectively through pipe lines 236 and 237 into two of the pipe lines 228, and for a purpose to be hereinafter specified are positioned at one side of the header 227. The valves 233 and 234 are similarly positioned on the opposite side of the header 227, and serve to connect the cylinders 162 of the first and second clamping mechanisms into two other pipe lines 228 through pipe lines 238 and 239 respectively. The remaining valve 235 serves to connect the cylinder 189 for the saw mechanism through the pipe line 240 into the last pipe line 228. Each four way valve (see Fig. 21) is so constructed that in being oscillated from one extreme position to the other it will alternately connect opposite ends of the cylinder which it controls with the header 227 and the return pipe 229.

The control stand.

The control stand 241 (see Fig. 5) is positioned between the drilling mechanisms and opposite the sawing mechanism. The valve stems 242 of the four way valves project through the stand and are provided with hand levers 243. To secure simultaneous operation of the drilling mechanisms, the hand levers 243 for the valves 231 and 232 are connected by a link 244, and to obtain a like result for the clamping mechanisms the hand levers for the valves 233 and 234 are connected by a similar link 245. From his position at the control stand the operator can observe and control the working movements of all the units of the machine. He can also conveniently adjust the drills 115 of either drilling mechanism horizontally and vertically.

Brief résumé of the operation.

Assuming that rails are to be unloaded at the front end of the building and to be reloaded at the rear end of the building, two cars 25 with damaged rails are positioned next to the open spaces 21 and 22 and empty cars 25 which preferably were previously unloaded at the other end of the building are positioned adjacent the open spaces 23 and 24. The guides 46 are swung outward to rest on the cars. Rails are unloaded onto the guides 46, and are moved along the skids 43 successively into position on the roll table at the front of the machine. From there, the rails are fed endwise and in series to the machine.

In the machine operation, the rear end of the foremost rail in the machine is clamped in the second drilling mechanism, and the leading end of the following rail is clamped in the first drilling mechanism. Before being clamped, the rails are moved against the gage blocks 41 on the roll tables to produce reclaimed rails of an exact and uniform length. When the two rails have been correctly positioned, the levers 243 for the valves 233 and 234 are operated to clamp them securely in place. Thereafter the levers 243 for the valves 231 and 232 are operated to effect a movement of the drills 115 toward the rails to drill the bores for the connecting bolts. In this connection it is to be noted that any desired number of drills may be employed, and that the drills can be relatively adjusted laterally to properly position them for rails of different sizes and shapes. Simultaneous with the operation of the drilling mechanisms, the lever for the valve 235 is operated to lower the carriage 178, thereby causing the saws 204 at opposite sides of said carriage to engage the adjacent ends of the two rails in the machine at that time. As the saw carriage 178 is lowered, coolant from the nozzles 211 is automatically applied with considerable force to the lower peripheral edges of the saws 204. The spent coolant which is thrown off by centrifugal force is caught together with other refuse from the sawing operation in the troughs 219 leading to the catch basing 220 at the right end of the machine. When the ends of the rails have been reclaimed, the hand levers 243 are actuated to return the operating units to their inoperative positions. The foremost rail is then discharged onto the roll table at the rear side of the machine and is replaced in the machine by the following rail. Another rail is advanced to the first drilling mechanism, and the cycle is repeated. In each operation one rail is reclaimed.

The rail discharged onto the roll table is moved along the skids 43 to either of the adjacent cars 25. Preferably rails which have been distorted laterally in one direction are loaded on one of the cars, and those which have been distorted in the other direction are loaded onto the other car. This obviates the necessity of turning the rails end for end in loading.

While I have shown the preferred embodiment of my invention as comprising a complete plant with two cars positioned at each side of the building, it is to be understood that when desired only one track 26 need be provided. In such event loading and unloading would take place at only one side of the building. The method and equipment which I have disclosed permit the reclaiming of rails at a high speed and at an extremely low cost. At no stage of the operation need the rails be turned to present opposite ends thereof first to the drilling mechanism and then to the saw or to sort them after the completion of the operation. The method is expeditious, efficient, labor saving, and safe.

I claim as my invention:

1. A rail reclaiming machine having, in combination, a pair of spaced supports, a roll table connecting said supports, two hydraulic clamps one associated with each support, two drilling mechanisms one associated with each support, and a single saw mechanism having two blades one of which is associated with each support.

2. A rail reclaiming machine having, in combination, a pair of spaced supports, a guideway connecting said supports, two clamps one associated with each support, two horizontal drilling mechanisms one associated with each support and adapted to drill the portion of the rail clamped therein, a sawing mechanism between said supports and having two blades one of which is associated with each support to cut off the end extending past said blade, and hydraulic means for operating said clamps, said drilling mechanisms, and said saw.

3. A rail reclaiming machine having, in combination, a base, a pair of spaced supports on said base, a guideway connecting said supports, a pair of rail clamps one associated with each support, means for actuating said clamps simultaneously, two spaced drilling mechanisms, one associated with each support, means for actuating said drilling mechanisms simultaneously, and means for cutting off the ends of the rail projecting beyond each drilling mechanism toward the other drilling mechanism.

4. A rail reclaiming machine having, in combination, a base, a pair of spaced supports mounted on said base, a guideway connecting said supports, a pair of drilling mechanisms associated with said supports, a twin blade saw mounted between said supports and between said drilling mechanisms, a control stand positioned between said drilling mechanisms and opposite said saw, and operating means for said units controlled by mechanism on said stand.

5. A rail reclaiming machine, having in combination, a base, a pair of spaced supports adapted to successively support the opposite ends of each rail and to support the adjacent ends of two successive rails, a pair of horizontal drilling mechanisms one associated with each support, two clamps one associated with each support, a tilting saw mechanism mounted between said supports and adapted to saw off the adjacent ends of said successive rails projecting beyond said drilling mechanisms toward each other, and means for operating said units.

6. A rail reclaiming machine having, in cobination, means for supporting a rail, a pair of clamps mounted in spaced relation for engaging the opopsite ends of said rail, means for operating said clamps simultaneously, a pair of drilling mechanisms one associated with each clamp, means for operating said drilling mechanisms simultaneously, and means for cutting the opposite ends of the rail.

7. A rail reclaiming machine having, in combination, a rail support, a horizontal drilling mechanism associated with said support and operable to drill one end of said rail, a tilting carriage mounted along side said support, a motor on the end of said carriage, a saw blade on the motor shaft and associated with said support, and means for operating said drilling mechanism and said carriage.

8. A rail reclaiming machine having, in combination, a base, a rail support on said base, a drilling mechanism having a plurality of drills associated with said support, a sawing mechanism, means for supplying coolant to the saw and said drills, means for conducting away sludge and other waste products, and hydraulic means for operating said drilling mechanism and said sawing mechanism.

9. In a rail reclaiming machine, in combination, a base, a rail support on said base, a pivotal carriage on said base next to said support, a piston and cylinder unit pivotally mounted on said base, a universal connection between said carriage and the piston rod of said unit, pressure fluid means for said unit, and a saw mounted on the end of said carriage adapted to engage the rail on said support.

10. A rail reclaiming machine having, in combination, a guideway adapted to receive rails in series, two clamping mechanisms and a twin blade sawing mechanism between said clamping mechanisms mounted on one side of said guideway, and two drilling mechanisms mounted on the other side of said guideway opposite to said clamping mechanisms, said mechanisms being operable to successively saw and re-drill the opposite ends of each rail as it is advanced along the guideway.

11. A rail reclaiming machine having, in combination, a combined work support and clamping mechanism adapted to receive a rail, a drilling mechanism having a plurality of drills laterally and vertically adjustable opposite said clamping mechanism, and means for operating said mechanisms.

12. A rail reclaiming machine having, in combination, a supporting means for a rail, means for clamping said rail in either of two positions on said supporting means, two drilling mechanisms mounted next to said supporting means and adapted to operate successively on opposite ends of each rail when in said two positions respectively, and means for operating said clamping means and said mechanisms.

13. A rail reclaiming machine having, in combination, a support adapted to receive a rail, a drilling mechanism mounted on one side of said support, a sawing mechanism mounted on the other side of said support, means for operating said mechanisms, and means for supplying coolant to the saw of said sawing mechanism, said means being automatically rendered operable and inoperable as said saw is moved toward and from the rail respectively.

14. A rail reclaiming machine having, in combination, a support adapted to receive a rail, a drilling mechanism associated with said support, a cutting mechanism associated with said support, means for operating said mechanisms, and means for supplying coolant to said cutting mechanism, said means being automatically controlled by the movements of said cutting mechanism.

15. A rail reclaiming machine having, in combination, a support, a drilling mechanism associated with said support, a sawing mechanism comprising a tilting carriage associated with said support, said carriage having a high speed saw, means for operating said drilling mechanism and for tilting said carriage to move said saw into and out of engagement with the rail, means for directing coolant against said saw, said means being automatically controlled by the position of said carriage, and means for conducting away the refuse from the operation.

16. A rail reclaiming machine, having in combination, a support adapted to receive a rail, gage means for positioning the rail on said support, means for clamping one end of the rail on said support, means for cutting off the old end of said rail, and means for redrilling the cut end of said rail.

17. A rail reclaiming machine having, in combination, a support adapted to receive rails in series which are to be thereon advanced from one position to another, gage means associated with said support for properly positioning said rails in each position, means for clamping said rails on said support, means for sawing the adjacent ends of two rails clamped in successive positions, means for drilling said ends, and means for operating said last three mentioned means.

18. In a rail reclaiming machine, in combination, a roll table adapted to support the rail, a screw extending longitudinally of and below said table, a plurality of gage blocks adjustably mounted on said screw at different points along the same and in different angular positions relative thereto, and means for rotating said screw to swing said blocks selectively into operative position above said table to engage the end of a rail.

19. A rail reclaiming machine having, in combination, two combined work supports and clamping mechanisms, an intermediate roll table between said supports, two drilling mechanisms one mounted opposite each clamping mechanism, a sawing mechanism mounted next to said intermediate roll table and having two saws one associated with each clamping mechanism, two roll tables one located at each end of said first mentioned table and being in alinement therewith, and adjustable gage means associated with said last mentioned roll tables for positioning the adjacent ends of a pair of rails in series in said clamping mechanisms.

20. A rail reclaiming machine having, in combination, means for successively supporting each of a series of rails in a plurality of positions, means for successively sawing off the old ends of each rail when in said positions respectively, and means associated with said supporting means for conveying away the sawed off ends of said rails.

21. A rail reclaiming machine having, in combination, means for supporting a plurality of rails, said means including two roll tables one mounted at each end, means operable to reclaim first one end and then the other end of each rail as it is advanced along said supporting means, means for locating said rail in each position, and conveying means mounted beneath each roll table for carrying away waste material resulting from the reclaiming operation.

22. A rail reclaiming machine having, in combination, a support, means associated with said support for operating upon each of a series of rails to successively reclaim first one end and then the other end thereof, and means for conveying away the refuse resulting from the reclaiming operation.

23. In a rail reclaiming machine, in combination, a roll table adapted to support a rail, a plurality of spaced standards supporting said table, two pairs of tracks supported by and extending through said standards below said table, and a continuous conveyor mounted on said tracks for carrying away waste products resulting from the machine operation.

24. In a rail reclaiming machine, in combination, a support adapted to receive a rail, a clamping head adapted to engage the top of the rail, movable clamping means adapted to engage the sides of the base of the rail, and a single hydraulic means for simultaneously operating said head and said clamping means to clamp the rail on said support or to release said rail.

25. In a rail reclaiming machine, in combination, a support adapted to receive a rail, a pivotal carriage having a saw associated with said support, and means for supplying coolant to said saw, said means having a valve automatically controlled by the position of said carriage.

26. In a rail reclaiming machine, in combination, a support adapted to receive a rail, a carriage movable laterally toward and from said support, a drill head vertically adjustable on said carriage, said head having a plurality of spaced drills, and means for individually adjusting said drills laterally relative to each other, and hydraulic means for moving said carriage.

27. In a rail reclaiming machine, in combination, a support, a drill carriage, said support and said carriage being relatively reciprocable toward and from each other, a housing adjustable on said carriage laterally of said support, a plurality of drills in said housing, said drills being independently adjustable relative to each other and longitudinally of said support, and means for effecting a relative movement between said support and said carriage.

28. In a rail reclaiming machine, in combination, a table adapted to support a rail, and means for positioning the rail on said table, said means including a plurality of members spaced along said table and independently adjustable, and including means for moving said members selectively into operative position to define the location of the rail on said table.

29. A rail reclaiming equipment having, in combination with a building, a machine therein for operating successively upon opposite ends of each rail to saw and re-drill them, two roll tables one on each side of said machine, and a plurality of spaced supporting skids extending from opposite sides of each table to the sides of said building, said roll tables and said supporting skids constituting work handling structures for facilitating the moving of rails endwise and in series to and from the machine.

30. A rail reclaiming equipment having, in combination, a base, means on said base for successively supporting opposite ends of a series of rails, a pair of spaced drilling mechanisms mounted on said base to operate on the adjacent ends of two successive rails, a sawing mechanism having two spaced blades operable to saw off the adjacent old ends of said successive rails projecting beyond said drilling mechanisms toward each other, a work handling structure including a table for feeding rails to said first drilling mechanism, and a similar work handling structure for receiving rails from said second drilling mechanism.

31. A rail reclaiming equipment having, in combination, a double drill and sawing mechanism for sawing and re-drilling the opposite ends successively of each rail, and for simultaneously sawing and re-drilling the adjacent ends of two successive rails, a work handling structure mounted at one side of said mechanism and adapted to facilitate feeding the rails in series and endwise to said mechanism, and a work handling structure at the other side of said mechanism for receiving the reclaimed rails from said mechanism and facilitating their removal.

32. A rail reclaiming equipment having, in combination, a machine for sawing and re-drilling the ends of rails, said machine having a guideway through which the rails are to be moved endwise and in series, a pair of tables one at each side of said guideway and in alinement therewith, and a plurality of spaced supporting skids extending oppositely from each side of each table for facilitating the movement of rails from or into position on said tables.

33. A rail reclaiming equipment having, in combination, a rail reclaiming machine for cutting off the old ends and redrilling the new ends of damaged rails, two rail handling structures one mounted on each side of said machine, and tracks extending along opposite sides of the rail handling structures to permit the positioning of cars in any of four positions, one of said rail handling structures being adapted to receive rails from either of two cars in adjacent positions, and the other of said rail handling structures being adapted to deliver rails to either of two cars in the adjacent positions.

34. A rail reclaiming equipment having, in combination, a rail reclaiming machine for sawing and drilling the ends of damaged rails and two work handling structures one mounted at each side of said machine, one structure being adapted to receive rails through openings in the side walls of one end of a building enclosing said equipment and to facilitate feeding them to the machine and the other structure being adapted to receive the reclaimed rails and to facilitate discharging them laterally through openings in the side walls of the other end of the building.

In testimony whereof, I have hereunto affixed my signature.

HANS B. KRAUT.